United States Patent
Burns et al.

(10) Patent No.: US 11,455,436 B2
(45) Date of Patent: Sep. 27, 2022

(54) PREDICTING ACROSS WAFER SPIN-ON PLANARIZATION OVER A PATTERNED TOPOGRAPHY

(71) Applicant: Tokyo Electron Limited, Tokyo (JP)

(72) Inventors: Ryan Burns, Austin, TX (US); Mark Somervell, Hillsboro, OR (US)

(73) Assignee: Tokyo Electron Limited, Tokyo (JP)

( * ) Notice: Subject to any disclaimer, the term of this patent is extended or adjusted under 35 U.S.C. 154(b) by 310 days.

(21) Appl. No.: 16/829,416

(22) Filed: Mar. 25, 2020

(65) Prior Publication Data
US 2021/0303741 A1   Sep. 30, 2021

(51) Int. Cl.
G06F 30/10     (2020.01)
G06F 119/18    (2020.01)
G03F 7/16      (2006.01)

(52) U.S. Cl.
CPC ............. *G06F 30/10* (2020.01); *G03F 7/162* (2013.01); *G06F 2119/18* (2020.01)

(58) Field of Classification Search
CPC ....... G06F 30/10; G06F 2119/18; G03F 7/162
See application file for complete search history.

(56) References Cited

U.S. PATENT DOCUMENTS

| 4,600,597 A * | 7/1986 | White | ............... G03F 7/162 428/688 |
| 7,174,520 B2 * | 2/2007 | White | ............... G06F 30/39 700/121 |
| 7,175,940 B2 | 2/2007 | Laidig et al. | |
| 7,433,791 B2 | 10/2008 | Park et al. | |
| 7,452,817 B2 | 11/2008 | Yoon et al. | |
| 3,024,675 A1 | 9/2011 | Gupta et al. | |

(Continued)

FOREIGN PATENT DOCUMENTS

KR     10-0734305 B1     6/2007

OTHER PUBLICATIONS

Peurrung, L, & Graves, D. "Spin Coating Over Topography" IEEE Transactions on Semiconductor Manufacturing, vol. 6, No. 1, pp. 72-76 (1993) (Year: 1993).*

(Continued)

*Primary Examiner* — Jay Hann
(74) *Attorney, Agent, or Firm* — Wood Herron & Evans LLP

(57) ABSTRACT

Methods used to more accurately predict spin on layer planarization over a patterned topography are provided. Methods are provided for generating a layer critical dimension model. In one embodiment, the critical dimension model is a layer thickness model that more accurately simulates patterned topography trends, as a function of feature dimensions, surrounding pattern density and radial position across the patterned topography. Additional methods are provided for calibrating the layer thickness model over one or more spatial areas to account for radial variations in the patterned topography. Further methods are provided for using one or more calibrated layer thickness models to predict a thickness of a layer (e.g., a spin on coating) as it is being deposited onto a patterned substrate. The methods disclosed herein may facilitate the planarization (i.e., flatness) of spin-on coatings during the device fabrication to form a uniformly planar layer or layer on the substrate.

21 Claims, 8 Drawing Sheets

(56) References Cited

U.S. PATENT DOCUMENTS

| | | | |
|---|---|---|---|
| 10,622,267 B2* | 4/2020 | Burns | G06F 30/20 |
| 2007/0059946 A1 | 3/2007 | Mulders | |
| 2010/0012622 A1 | 1/2010 | Panga et al. | |
| 2011/0079579 A1 | 4/2011 | Allen et al. | |
| 2011/0312180 A1 | 12/2011 | Wang | |
| 2012/0307233 A1* | 12/2012 | Boguslavskiy | H01L 21/67109 |
| | | | 356/43 |
| 2013/0113086 A1 | 5/2013 | Bai et al. | |
| 2016/0048080 A1 | 2/2016 | deVilliers | |
| 2016/0300726 A1 | 10/2016 | deVilliers | |
| 2018/0096905 A1 | 4/2018 | Burns et al. | |
| 2021/0389666 A1* | 12/2021 | Sreenivasan | G01Q 60/24 |

OTHER PUBLICATIONS

Kim, Y., et al. "CHAMPS (CHemicAl-Mechanical Planarization Simulator)" IEEE Int'l Conf. on Simulation Semiconductor Processes & Devices (2000) available from <https://ieeexplore.ieee.org/abstract/document/871223> (Year: 2000).*

Kim, Y., et al. "Prediction of Resist Non-Uniformity Caused by Underlying Pattern Density and Topology" IEEE Digest of Papers Microprocesses & Nanotechnology 2000, Int'l Conf. Microprocesses & Nanotechnology (2000) available from <https://ieeexplore.ieee.org/abstract/document/872641> (Year: 2000).*

Korean Intellectual Property Office, The International Search Report and the Written Opinion for International application No. PCT/US2017/055098, dated Jan. 19, 2018, 7 pg.

The International Bureau of WIPO, International Preliminary Report on Patentability in corresponding International Application No. PCT/US2017/055098, dated Apr. 18, 2019, 8 pg.

* cited by examiner

PREDICTING ACROSS WAFER SPIN-ON PLANARIZATION OVER A PATTERNED TOPOGRAPHY

RELATED APPLICATIONS

This application is related to U.S. patent application Ser. No. 15/724,632 filed on Oct. 4, 2017, entitled "Facilitation of Spin-Coat Planarization Over Feature Topography During Substrate Fabrication," to Burns et al. that issued as U.S. Pat. No. 10,622,267 on Apr. 14, 2020, the entire contents of which are herein incorporated by reference.

BACKGROUND

In the manufacture of micro-scale or nano-scale devices, various fabrication processes are executed and repeatedly performed to create functional device elements on a substrate. Examples of micro-scale or nano-scale devices include semiconductor devices, electronic devices, mechanical devices, etc. Examples of fabrication processing include processes for layer (or film) forming, etching, patterning, cleaning, doping, annealing, treating, planarizing, etc. As used herein, "layer" and "film" may be considered to be interchangeable terms.

Typically, these devices are produced as part of a layered device fabrication process of, for example, a substrate (e.g., a semiconductor wafer). In some instances, a coating is "spun-on" to the substrate to form a uniform layer (or film). Spin coating a material enhances its uniformity in coverage and planarization. As used herein, planarization or planar refers to the consistent uniform thickness of a layer (or film).

Spin coating (or spin-on coating) is a procedure used to deposit uniform thin layers to flat substrates (e.g., semiconductor wafer). Usually, a small amount of coating material is applied on the center of the substrate, which is either spinning at low speed or not spinning at all. The substrate is then rotated at high speed in order to spread the coating material by centrifugal force. A machine used for spin coating is called a spin coater, or simply spinner.

Rotation is continued while the fluid spins off the edges of the substrate, until the desired thickness of the layer is achieved. The applied solvent is usually volatile, and simultaneously evaporates. So, the higher the angular speed of spinning, the thinner the layer. The thickness of the layer also depends on the material properties, such as the viscosity and concentration of the solution and the solvent.

The micro- and nano-scale electronics processing to build integrated circuits requires multiple layer coatings over patterned topography. Deviations in layer thickness for spin on coatings over patterned topography often drive downstream processing beyond required specifications. For example, errors introduced into downstream processing operations due to deviations in layer thickness height may include, but are not limited to, lithographic critical dimension (CD) changes due to reflectivity, lithographic focus control, etch depth, and subsequent deposition processes. Additionally, some three-dimensional (3D) circuit designs and processes, such as pattern reversals and exhuming materials post spacer processes, require stringent levels of layer thickness control over topography.

Planarizing spin on layers is an on-going challenge within the semiconductor industry. Traditional methods to control or improve planarization involve material modifications, design rule changes, and/or processing adjustments. However, the increasing complexity of 3D topography creates even more challenges for spin on planarization. This creates a need to adequately model and predict spin on layer planarization over patterned topography.

SUMMARY

The present disclosure provides various embodiments of methods, which may be used to more accurately predict spin on layer planarization over a patterned topography. In some embodiments, for example, methods are provided for generating a critical dimension model. In one embodiment, the critical dimension model is a layer thickness model that more accurately simulates patterned topography trends, as a function of feature dimensions, surrounding pattern density and radial position across the patterned topography. Additional methods are provided for calibrating the layer thickness model over one or more spatial areas to account for radial variations in the patterned topography. Further methods are provided for using one or more calibrated layer thickness models to predict a thickness of a film (e.g., a spin on coating) as it is being deposited onto a patterned substrate. Accordingly, the methods disclosed herein may facilitate the planarization (i.e., flatness) of spin-on coatings during the device fabrication to form a uniformly planar layer (or film) on the substrate.

According to one embodiment, a method is provided herein for predicting a layer thickness of a layer being deposited onto a patterned substrate. In general, the method may include receiving substrate patterning information for the patterned substrate; generating a layer critical dimension model based, at least in part, on the substrate patterning information and layer critical dimension measurement values; applying a first calibration model algorithm to the layer critical dimension model to calibrate the layer critical dimension model over a first spatial area defined by a first radius; and applying a second calibration model algorithm to the layer critical dimension model to calibrate the layer critical dimension model over a second spatial area defined by a second radius, which is greater than the first radius.

According to one embodiment, a method is provided herein for predicting a layer thickness of a layer being deposited onto a patterned substrate. In general, the method may include receiving substrate patterning information for the patterned substrate; generating a layer thickness model based, at least in part, on the substrate patterning information and layer thickness measurement values; applying a first calibration model algorithm to the layer thickness model to calibrate the layer thickness model over a first spatial area defined by a first radius; and applying a second calibration model algorithm to the layer thickness model to calibrate the layer thickness model over a second spatial area defined by a second radius, which is greater than the first radius.

The substrate patterning information may include one or more feature dimensions and/or feature shapes of one or more features formed on or within the patterned substrate. In some embodiments, the substrate patterning information may further include a pattern density surrounding the one or more features formed on or within the patterned substrate. In some embodiments, the one or more feature dimensions and/or feature shapes of the one or more features may vary across the patterned substrate. For example, the one or more feature dimensions and/or the feature shapes may vary across the patterned substrate as a function of substrate radius (R), feature critical dimension (CD), pitch (p) between features and/or the pattern density (PD) surrounding the one or more features. Variances in the one or more feature dimensions and/or feature shapes may result in layer thickness differences across the patterned substrate.

In some embodiments, generating a layer thickness model may include generating a topography map of the patterned substrate based, at least in part, on the substrate patterning information, wherein the topography map includes an arrangement of one or more features formed on or within the patterned substrate; receiving the layer thickness measurement values, wherein the layer thickness measurement values include a plurality of layer thickness data points that correspond to the one or more features formed on or within the patterned substrate; and generating the layer thickness model based, at least in part, on the topography map and the plurality of layer thickness data points. In some embodiments, the topography map may further include a pattern density surrounding the one or more features.

In some embodiments, the first calibration model algorithm may include a mathematical representation of the layer thickness at each location in a user defined grid. In such embodiments, said applying the first calibration model algorithm may include summing a constant multiplied with a selectable proximity function and locations of features within the user defined grid across the first radius, and adding a blanket layer thickness to the sum. In some embodiments, the first calibration model algorithm may be applied to the layer thickness model over the first spatial area to generate a first calibrated layer thickness model that accounts for feature affects in the prediction of layer thickness.

In some embodiments, the second calibration model algorithm may be applied to the layer thickness model over the second spatial area to generate a second calibrated layer thickness model that accounts for surrounding pattern density affects in the prediction of layer thickness. In one embodiment, the second calibration model algorithm may include a linear bias model that derives a pattern density correction factor, which is linearly proportional to a pattern density surrounding the one or more features. In another embodiment, the second calibration model algorithm may include an exponential bias model that derives a pattern density correction factor, which is proportional to a pattern density surrounding the one or more features through an exponential function.

In some embodiments, the method may determine if there are additional spatial areas of the layer thickness model that require calibration. If the method determines that one or more additional spatial areas of the layer thickness model remain, the method may further include applying an additional calibration model algorithm to the layer thickness model to calibrate the layer thickness model over an additional spatial area defined by a next largest radius; and repeating said determining and said applying an additional calibration model algorithm until no additional spatial areas remain. In some embodiments, one or more additional calibration model algorithms may be applied to the layer thickness model over one or more additional spatial areas to generate one or more additional calibrated layer thickness models that account for surrounding pattern density affects in the prediction of layer thickness.

In some embodiments, the method may further include: obtaining inputs, including design data and one or more calibrated layer thickness models; converting the design data to a normalized format with locations specified on a user defined grid; and applying the one or more calibrated layer thickness models to the converted design data to generate output representing the layer thickness of the layer deposited onto the patterned substrate at each location on the user defined grid.

In some embodiments, said applying the one or more calibrated layer thickness models may include applying a first calibrated layer thickness model generated by said applying the first calibration model algorithm to the layer thickness model over the first spatial area. As noted above, the first calibrated layer thickness model may account for feature affects in the output representing the layer thickness.

In some embodiments, said applying the one or more calibrated layer thickness models may include applying a second calibrated layer thickness model generated by said applying the second calibration model algorithm to the layer thickness model over the second spatial area. As noted above, the second calibrated layer thickness model may account for surrounding pattern density affects in the output representing the layer thickness.

In some embodiments, said applying the one or more calibrated layer thickness models may include applying one or more additional calibrated layer thickness models generated by applying one or more additional calibration model algorithms to the layer thickness model over one or more additional spatial areas. As noted above, the one or more additional calibrated layer thickness model may account for surrounding pattern density affects in the output representing the layer thickness.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
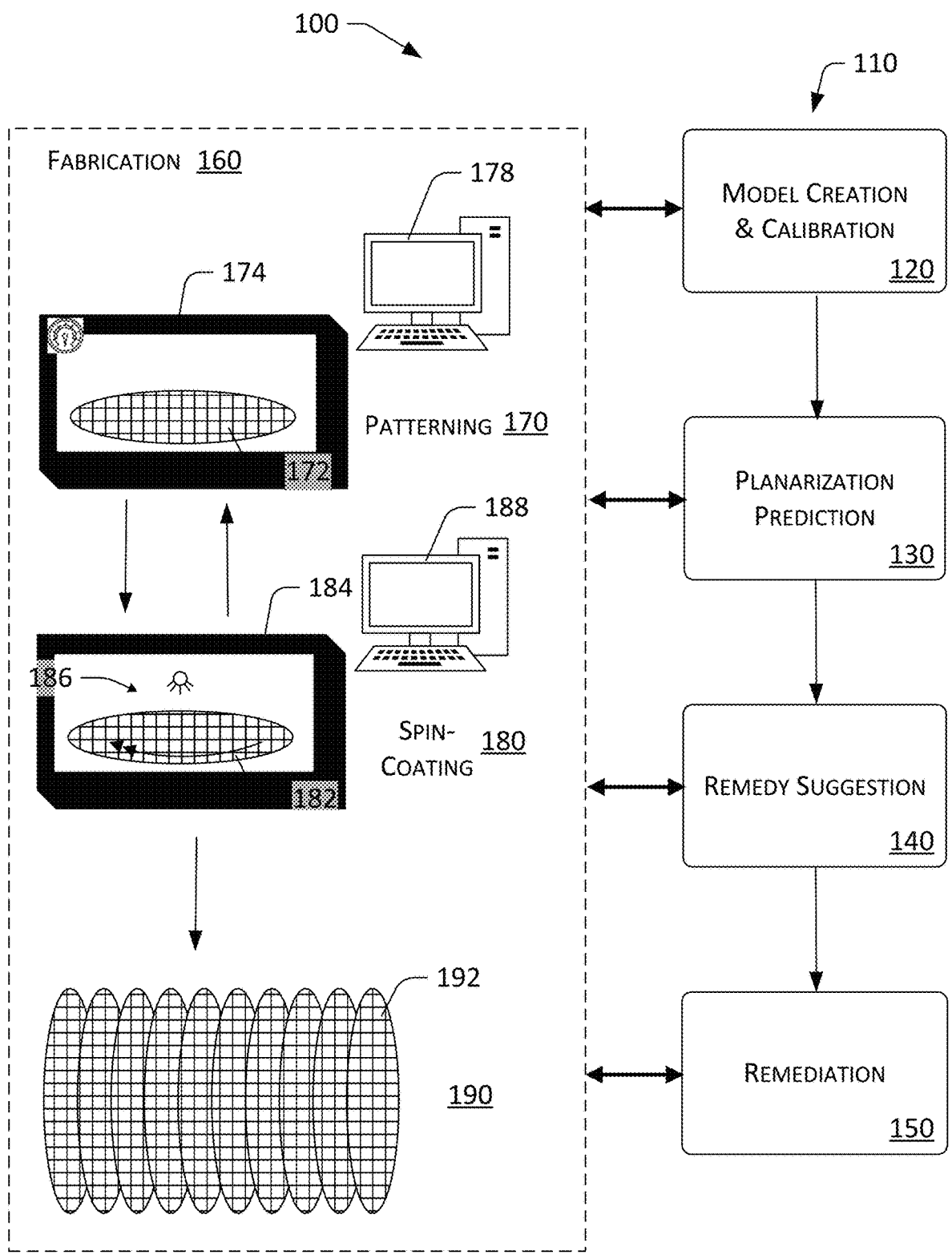
FIG. 1 illustrates an example scenario in which one or more implementations of the technology described herein may be incorporated.

Typically, with device fabrication, it is desirable to achieve a uniform planarization (i.e., flatness) of spin-on coatings across the substrate. That is, the layer that results from the spin-on coating should have a uniformly flat surface. The resulting layer thickness uniformity (or lack thereof) is affected or achieved by many planarization-enhancing factors and actions. Such factors/actions include material properties, underlying topography, and post-application smoothing.

The properties of the materials applied to a substrate affect the resulting thickness uniformity of the final layer. Examples of such properties include the viscosity of the coating being dispensed, the amount of material applied, the location of the material on the substrate, and the timing/speed/acceleration of the spin.

In addition, the underlying topography of the substrate affects the uniformity of the layer. Typically, features are etched into the substrate to form the devices. This etching forms a specific topography on the resulting surface. The etched or patterned surface of the substrate is referred to herein as the "patterned topography". Once the features are formed, a spin-on coating is subsequently applied to the patterned topography. Since the patterned topography is not a flat surface, the features affect the coating application, and ultimately, the uniformity of the resulting layer.

After a spin on layer is applied to a substrate, the layer may be non-uniform. This non-flat layer can be fixed after application of the coating, either mechanically or chemically. That is, a rough or bumpy layer may be polished using the appropriate chemicals and/or with a mechanical polisher.

While post-application smoothing actions are available to enhance and facilitate the planarization of a spin-on layer, they cannot be used to effectively predict the non-uniformity of the next to-be-applied spin on layer. In addition, these actions cannot offer recommendations for planarization-enhancing factors and/or actions that may be taken to ameliorate a predicted lack of flatness of the next to-be-applied spin on layer.

In the related U.S. patent application Ser. No. 15/724,632, the present inventors described embodiments of technologies to effectively model and predict the non-uniformity of the next to-be-applied spin on layer (given known conditions). More specifically, the related application described embodiments of methods to facilitate the creation of a layer thickness model over a patterned topography. The ability to predict layer thickness outcomes over patterned topography for any design, process, and material combination has become increasingly necessary, as manufacturing technologies become more reliant on 3D structures (e.g., finfets, through silicon vias, gate all around, etc.).

After creating, calibrating and using a layer thickness model to predict layer thickness, the related application described embodiments of methods to recommend (or automatically implement) particular planarization-enhancing factors and/or actions that could be taken to ameliorate a predicted lack of flatness of the next to-be-applied spin on layer. In some embodiments, the related application suggested or implemented adjustments/selection of materials to improve planarization of the next to-be-applied spin on layer. Other embodiments of the related application suggested or implemented hardware solutions (e.g., chemical and/or mechanical smoothing), if the next to-be-applied spin on layer was predicted to be non-planar. Still further embodiments of the related application suggested or implemented a re-design of features of an underlying surface.

The related application disclosed embodiments of methods to calibrate a layer thickness model or models to accurately predict spin on layer planarization over patterned topography. The simulation and knowledge of layer thickness over patterned topography was based on, for example, incoming pattern density, planar layer thickness, material properties, and spin on process conditions. In one example embodiment, the related application disclosed a method of calibrating a layer thickness model to correct for pattern density variations by applying a Gaussian pattern density correction to the layer thickness model over a small radius (e.g., about 1 µm) to account for feature affects.

Like the related application, the present disclosure predicts spin on layer planarization by providing methods for creating and calibrating a layer model over a patterned topography. However, the present disclosure improves upon the methods disclosed in the related application by creating a layer critical dimension model that more accurately simulates patterned topography trends, as a function of feature dimensions, surrounding pattern density and radial position across the patterned substrate. The critical dimension may be any dimension of a layer, including but not limited to thickness, width, length, sidewall coverage, etc. as is known in the art. In one particular embodiment utilized for exemplary purposes herein, the critical dimension model is a layer thickness model. However, it will be recognized that thickness is merely one exemplary dimension and the techniques described herein more generally apply to critical dimension models. The present disclosure further improves upon the methods disclosed in the related application by calibrating the layer thickness model over one or more spatial areas of the patterned substrate (or die) to account for radial variations in the patterned topography. As such, the present disclosure provides a more accurate prediction of spin on layer planarization over the patterned substrate (or die).

Example Scenario

FIG. 1 illustrates an example scenario 100 in which one or more embodiments of the methods described herein may be incorporated. The example scenario 100 includes a functional representation 110 of an example implementation of the technology described herein (and in the related application), which included four functional sections: model creation and calibration 120, planarization prediction 130, remedy suggestion 140, and remediation 150. Each of these sections interacts with other sections and with one or more portions of a fabrication process 160 and/or components for fabricating a substrate (e.g., a semiconductor wafer). It is noted that the fabrication process 160 illustrated in FIG. 1 and described below is just one example of a substrate fabrication contemplated for use with the technology described herein.

As depicted in FIG. 1, the fabrication process 160 includes a patterning section 170, a spin-coating section 180, and an intermediate/final stack or holding bin 190. It is noted that the sections of the fabrication process 160 shown in FIG. 1 are merely intended to represent the portions of a typical fabrication that are most relevant to the example implementation related to the technology described herein. It does not represent all sections or portions of a suitable fabrication for this or other implementations of the technology described herein. Furthermore, the order of the sections of the fabrication process 160 shown in FIG. 1 is provided for illustration purpose only, and does not represent any required or necessary order for this or any other implementation.

The patterning section 170 includes a wafer 172 going through processes which may include lithography and/or etching 174. Lithography may include any process (e.g. photo, imprint, e-beam), which is able to form a pattern in a layer or substrate. Etching may include any process, which is able to transfer a pattern into a substrate. For example, with plasma etching, a plasma removes material from the surface of the wafer 172. The plasmas of the process gasses convert the material to be etched from the solid to the gaseous phase, and the vacuum pump (not shown) extracts the gaseous products. The use of masks can also ensure that only parts of the surface or structures are etched. The etching process is controlled and monitored by one or more computer systems 178.

The spin-coating section 180 includes a wafer 182 in a coating chamber 184. For example, a coating 186 may be dispensed onto the surface of the wafer 182 as it spins in the coating chamber 184. Ideally, the spin-coat material will form an even or uniform layer on the surface of the wafer 182. The spin-coating process is controlled and monitored by one or more computer systems 188.

The intermediate/final stack or holding bin 190 represents a collection of wafers (such as wafer 192) that have completed the fabrication process 160. Alternatively, the holding bin 190 may hold wafers as an intermediate step of the fabrication process 160.

As shown in FIG. 1, model creation and calibration 120, planarization prediction 130, remedy suggestion 140, and remediation 150 may each interact with one or more portions of fabrication process 160. For example, the model creation and calibration 120 section may generate and calibrate a layer thickness model of the patterned topography of a wafer 172 formed within the patterning section 170. That is, a computer system implementing the model creation and calibration 120 section may generate a computer-generated three-dimensional (3D) rendering of the many features of an etched wafer, based on design and process knowledge.

As described in more detail below, the model creation and calibration 120 section includes embodiments of methods for generating and calibrating a layer thickness model (or models), which can be used to accurately predict spin on layer thickness over patterned topography. Example details for how the model creation and calibration 120 section may create and calibrate a layer thickness model are described and discussed below with regard toward FIGS. 5-7.

The planarization prediction 130 section uses information about various material and environmental properties to simulate the spin-coat application to the patterned topography. The simulation and knowledge of layer thickness over pattern topography are based on, for example, incoming pattern density, planar layer thickness, material properties, and spin on process conditions. More specifically, the planarization prediction 130 section predicts the thickness of a spin on layer deposited over a patterned topography by applying a calibrated layer thickness model to design data. Example details for how the planarization prediction 130 section may predict layer thickness (i.e., spin on layer planarization) over a patterned topography are described and discussed below with regard toward FIG. 8.

Based upon the calibrated layer thickness model provided by the model creation and calibration 120 section and the prediction of layer thickness provided by the planarization prediction 130, the remedy suggestion 140 section generates one or more recommendations to facilitate or enhance planarization of the spin on coating for a given patterned topography.

The remedy suggestion 140 section determines the layer thickness of an area of the layer thickness model that falls with a defined range of desired layer thickness. In some implementations, the layer thickness measurements may have a defined range. For example the defined range may be in one merely exemplary embodiment from 95 nm to 105 nm. If the determined layer thickness falls within the defined range, the area of the layer thickness model is declared to meet the specification. If the determined layer thickness falls outside of the defined range, however, the remedy suggestion 140 section may suggest one or more corrective actions that could be taken to enhance planarization of that area of the layer thickness model. The actions suggested by the remedy suggestion 140 section may affect the fabrication process 160.

Remediation 150 section may take one or more corrective actions based on the recommendations of the remedy suggestion 140 section. Such action(s) may be automatic, manual, or some combination thereof. There are many different corrective actions that could be taken by the remediation 150 section. For example, corrective actions may include adjusting the spin-on coating process (e.g., spin velocity, the amount of coating applied, the rate of coating applied, spin acceleration, deposit location(s), etc.) or a sequence of spin process steps. Other examples of corrective actions may include adjusting a baking process, adjusting a lithography scanner process, or adjusting an etch process to compensate for material thickness (i.e., layer height control) during etching. Another example includes adjusting a downstream coating/deposition processes to help balance total planarization over topography. This helps with the overall planarization of the layer stack. Of course, other corrective actions are available and may be taken by the remediation 150 section to control spin on layer planarization.

One critical aspect of predicting spin coat layer planarization is the variance within the incoming patterned topography. For example, a patterned topography may exhibit variances in feature dimensions, feature shape and/or the pattern density surrounding one or more features formed on the patterned substrate. In some cases, large variances may exist across the patterned substrate (e.g., a wafer) or even across a die included on the substrate.

Figure 2A:
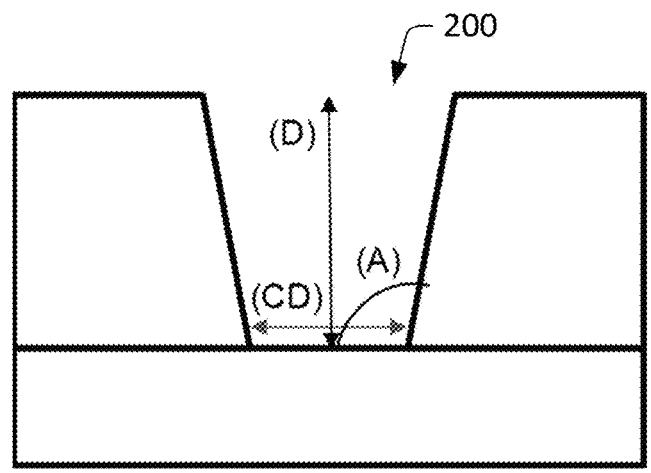
FIGS. 2A-2B illustrate example feature dimensions of a trench that may vary across a die or wafer.

FIG. 2A illustrates example feature dimensions of a trench 200 that may vary across a die or wafer. The feature dimensions shown in FIG. 2A include, but are not limited to, a trench CD (or bottom width), a trench depth (D) and a bottom angle (A). The bottom angle (A) of the trench 200 may also vary around the trench 200 in three dimensions.

Figure 2B:
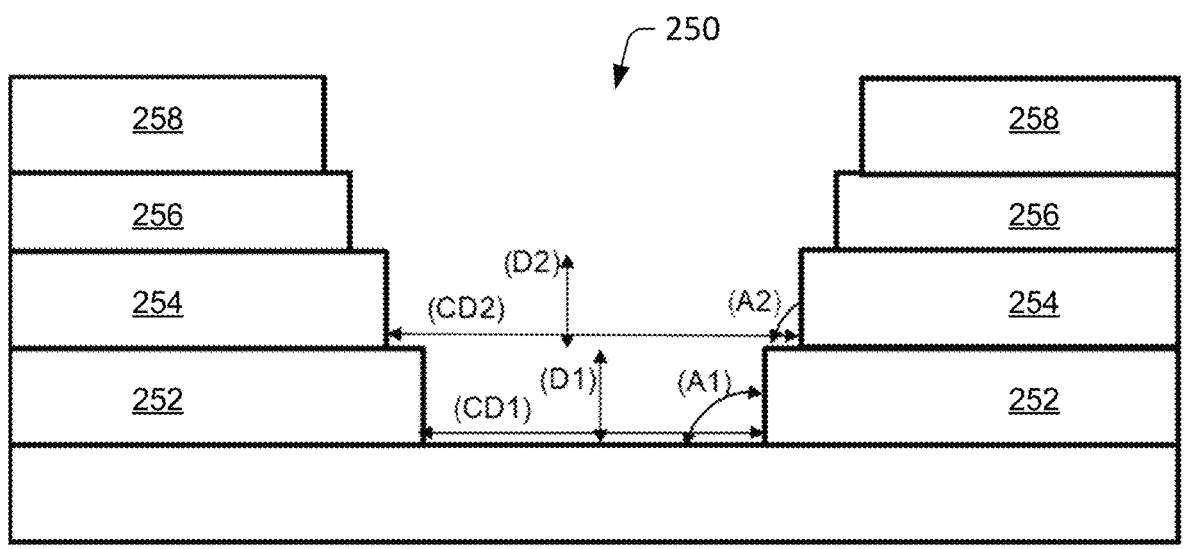

FIG. 2B illustrates how the feature dimensions of a trench 250 may change, depending on etch process conditions. As shown in FIG. 2B, etch process conditions may form a trench 250 having a plurality of steps 252, 254, 256, 258, instead of the relatively smooth sidewalls of the trench 200 shown in FIG. 2A. In some cases, the trench CD (CD1, CD2 . . . ), trench depth (D1, D2 . . . ) and/or bottom angle (A1, A2 . . . ) may differ for one or more steps of the trench 250, depending on the etch process conditions used to form the trench. In some cases, the changes in trench CD (CD1, CD2 . . . ), trench depth (D1, D2 . . . ) and/or bottom angle (A1, A2 . . . ) may vary across a die or wafer, causing the shape of the trench 250 to vary across the die or wafer.

When a spin on layer is deposited onto a patterned topography comprising trench 200 or trench 250, variances in the feature dimensions (e.g., CD, D and/or A) and/or variances in the trench shape may result in layer thickness differences across the die or wafer. In some cases, the feature dimensions of a trench and/or the trench shape may vary across a patterned topography as a function of substrate radius (R), trench CD, pitch (p) or distance between trenches and/or surrounding pattern density (PD), resulting in a complex layer thickness model.

Figure 3A:
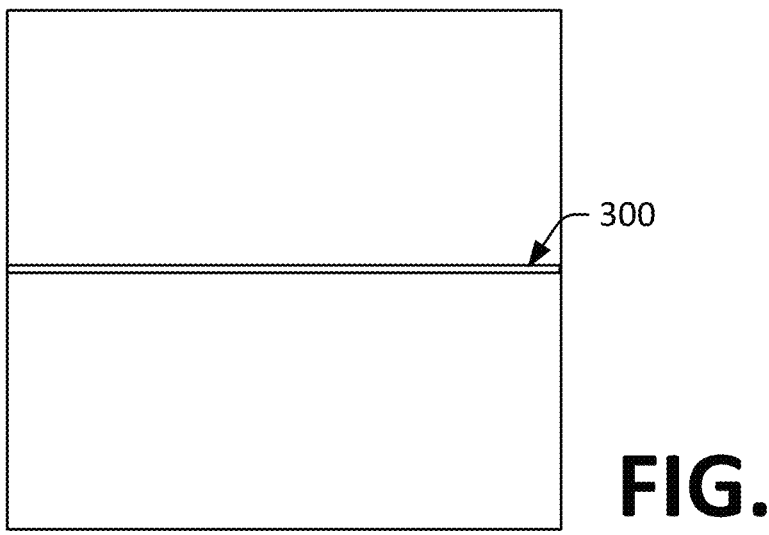
FIGS. 3A-3C provide examples of patterned topographies wherein a trench is surrounded by different pattern densities.
Figure 3B:
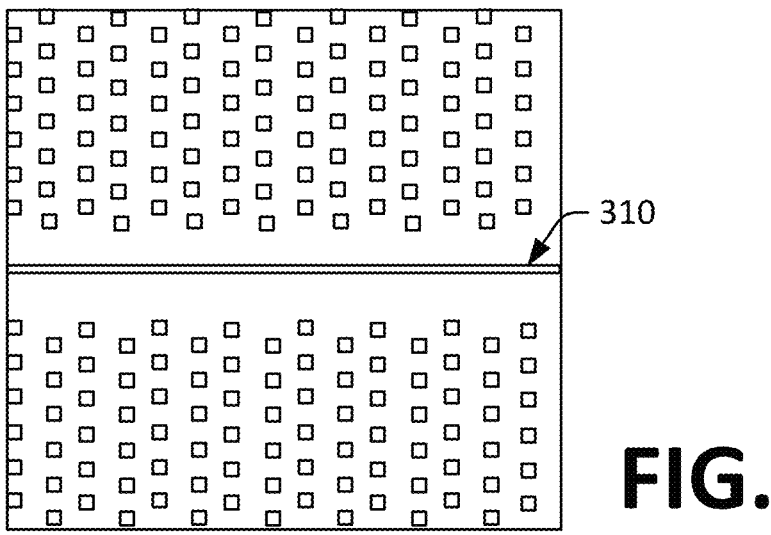
Figure 3C:
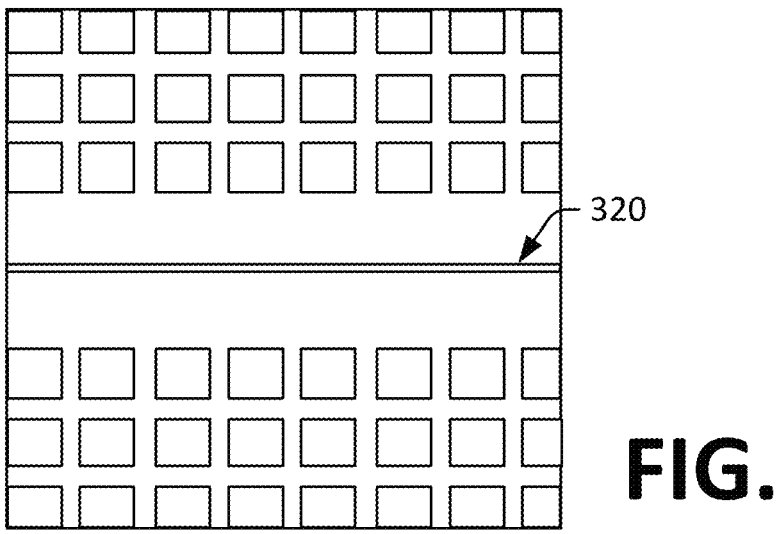

FIGS. 3A-3C provide examples of patterned topographies wherein a trench (such as trench 200 or trench 250) is surrounded by different pattern densities. In the example topography shown in FIG. 3A, trench 300 is formed within, and surrounded by, a relatively flat surface. In the example topography shown in FIG. 3B, trench 310 is surrounded by a pattern of relatively small features, resulting in a pattern density which is greater than that shown in FIG. 3A. In the example topography shown in FIG. 3C, trench 320 is surrounded by a pattern of larger features, resulting in a pattern density which is greater than that shown in FIG. 3B.

When a spin on layer is deposited onto the patterned topographies shown in FIGS. 3A-3C, the thickness of the deposited layer may vary across the patterned topography, depending on the pattern density surrounding the trench. Layer thickness generally decreases as the pattern density surrounding the trench increases. For example, a spin on layer deposited onto the patterned topography shown in FIG. 3A may be relatively uniform, since the topography surrounding the trench 300 is relatively flat. When a spin on layer is deposited onto the patterned topographies shown in FIGS. 3B and 3C, however, the pattern densities surrounding trench 310 and trench 320 may cause the thickness of the deposited layer to vary across the patterned topographies. Although the local impact on layer thickness in the near vicinity of trench 310 or 320 may be small, the impact on layer thickness over a larger radius can be greatly affected by the surrounding pattern density.

As described in more detail below, the present disclosure uses information regarding variances in the underlying patterned topography (e.g., variances in feature dimensions, feature shape and/or pattern density surrounding one or more features) to create a more accurate layer thickness model for the patterned topography. By calibrating the layer thickness model across different radial positions and/or different spatial areas of a die or wafer, the present disclosure provides a more accurate prediction of spin coat layer thickness across the die or wafer.

Figure 4A:
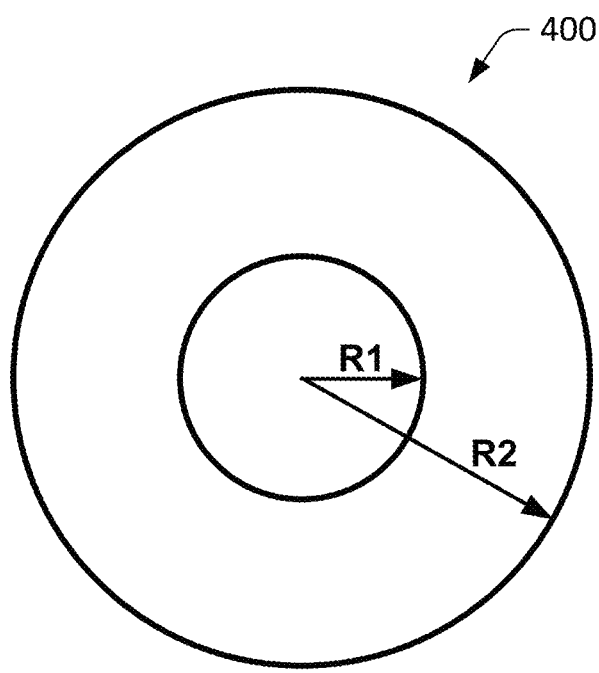
FIG. 4A illustrates an example scenario in which a layer thickness model is calibrated across one or more radial positions of a die or wafer.
Figure 4B:
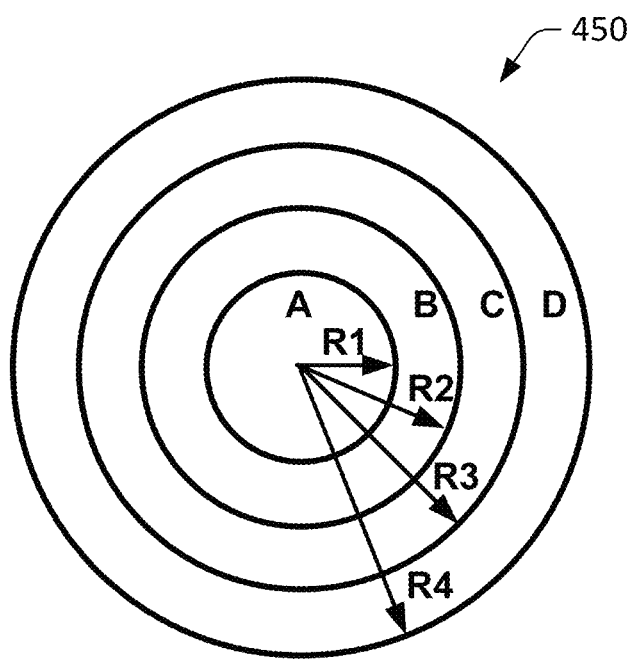
FIG. 4B illustrates an example scenario in which a layer thickness model is calibrated over one or more spatial areas of a die or wafer.

In some embodiments, a layer thickness model in accordance with the present disclosure may be calibrated over a first spatial area defined by a first radial position (R1), and over a second spatial area defined by a second radial position (R2), as depicted in the example scenario 400 shown in FIG. 4A. In other embodiments, the layer thickness model may be calibrated over a plurality of spatial areas (e.g., A, B, C and/or D), each defined by their own radial position (e.g., R1, R2, R3 and/or R4), as depicted in the example scenario 450 shown in FIG. 4B. Although two radial positions (R1 and R2) are depicted in FIG. 4A and four spatial areas (A, B, C and D) are depicted in FIG. 4B, the layer thickness model may be calibrated over any number of radial positions or spatial areas, as needed to accurately predict spin coat layer thickness across the die or wafer.

As described in more detail below, the embodiments shown in FIGS. 4A and 4B can be used to generate a separate calibrated layer thickness model for each radial position (e.g., R1 and/or R2) and each spatial area (e.g., A, B, C and/or D) of a die or wafer, so that a plurality of calibrated layer thickness models are generated over different spatially defined areas of the die or wafer. Applying the calibrated layer thickness models to design data obtained from each spatially defined area enables the present disclosure to account for any radial variation in spin coat planarization.

Model Creation and Calibration

Figure 5:
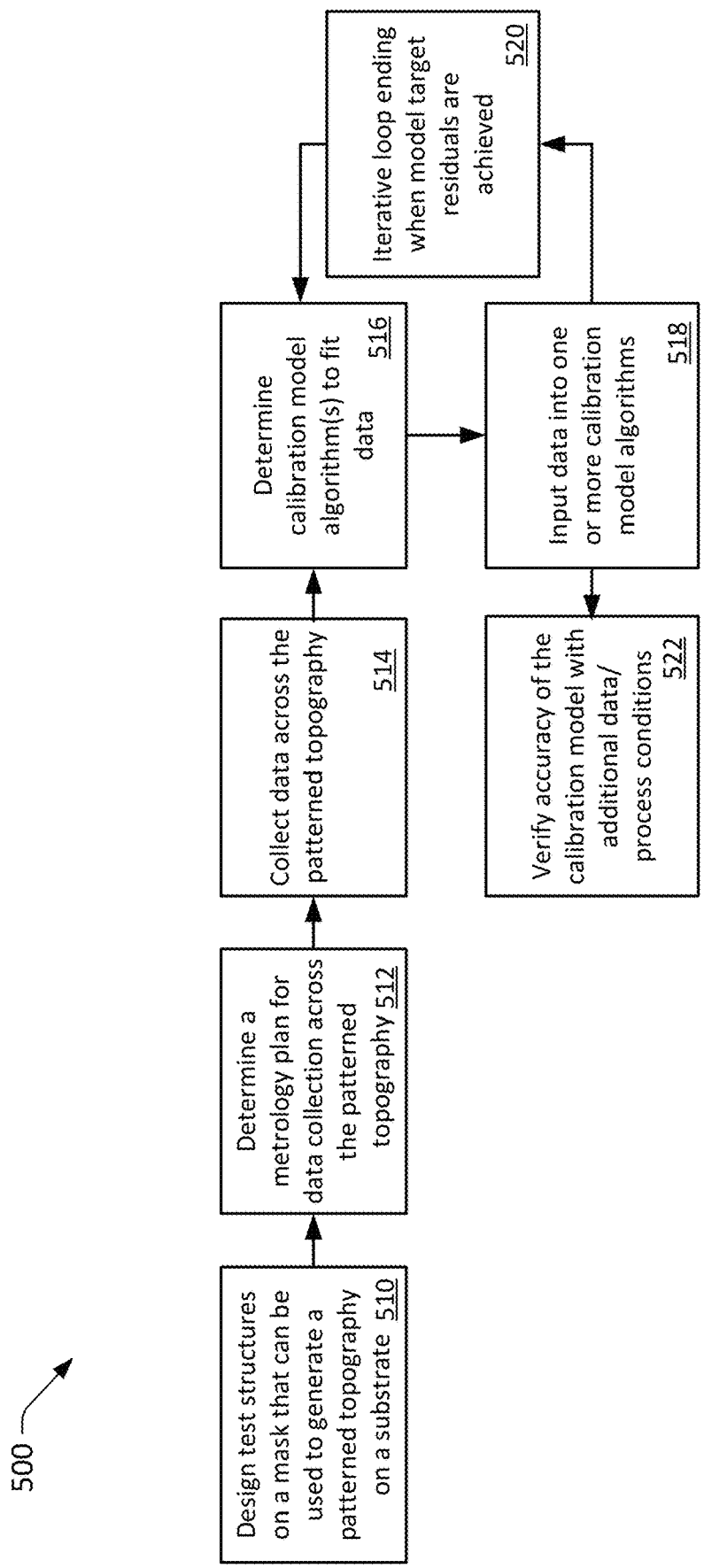
FIG. 5 is a high-level flow chart diagram illustrating one embodiment of a method or process that may be used to create and calibrate a layer thickness model over a patterned topography.
Figure 6:
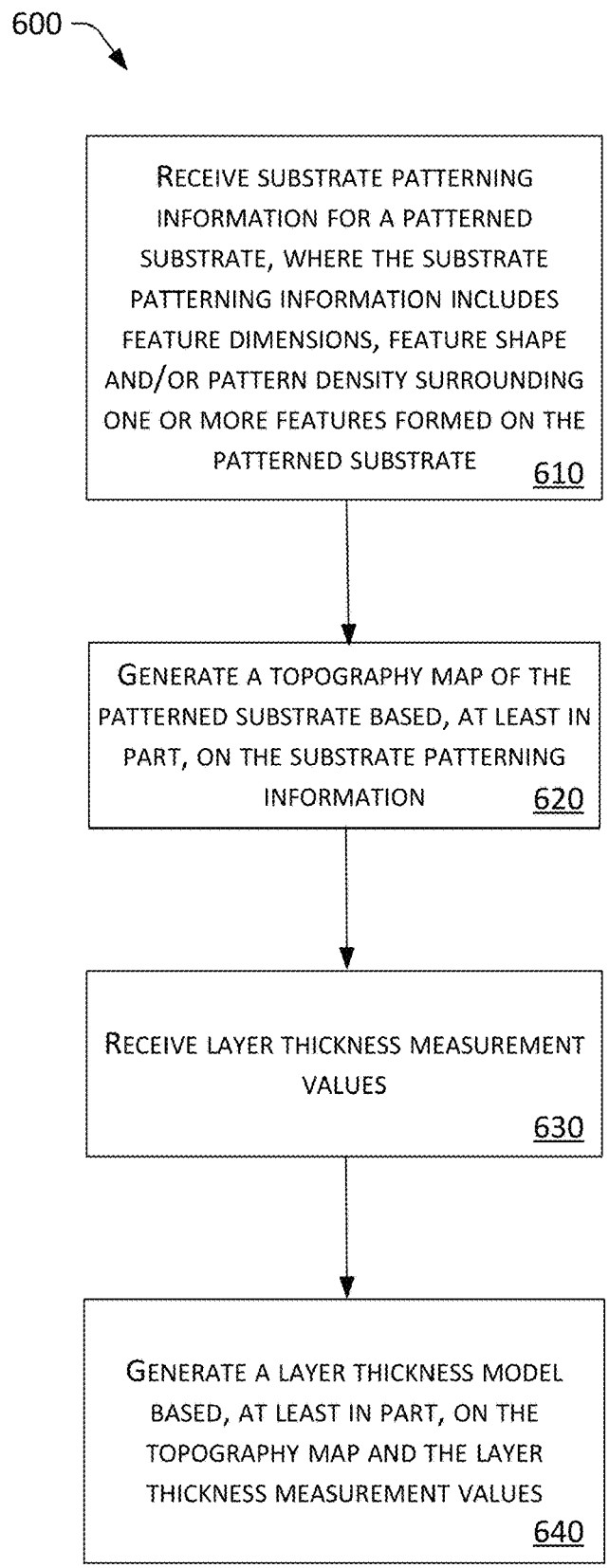
FIG. 6 is a flow chart diagram illustrating one embodiment of a method or process for generating a layer thickness model over a patterned topography in accordance with the technology described herein.
Figure 7:
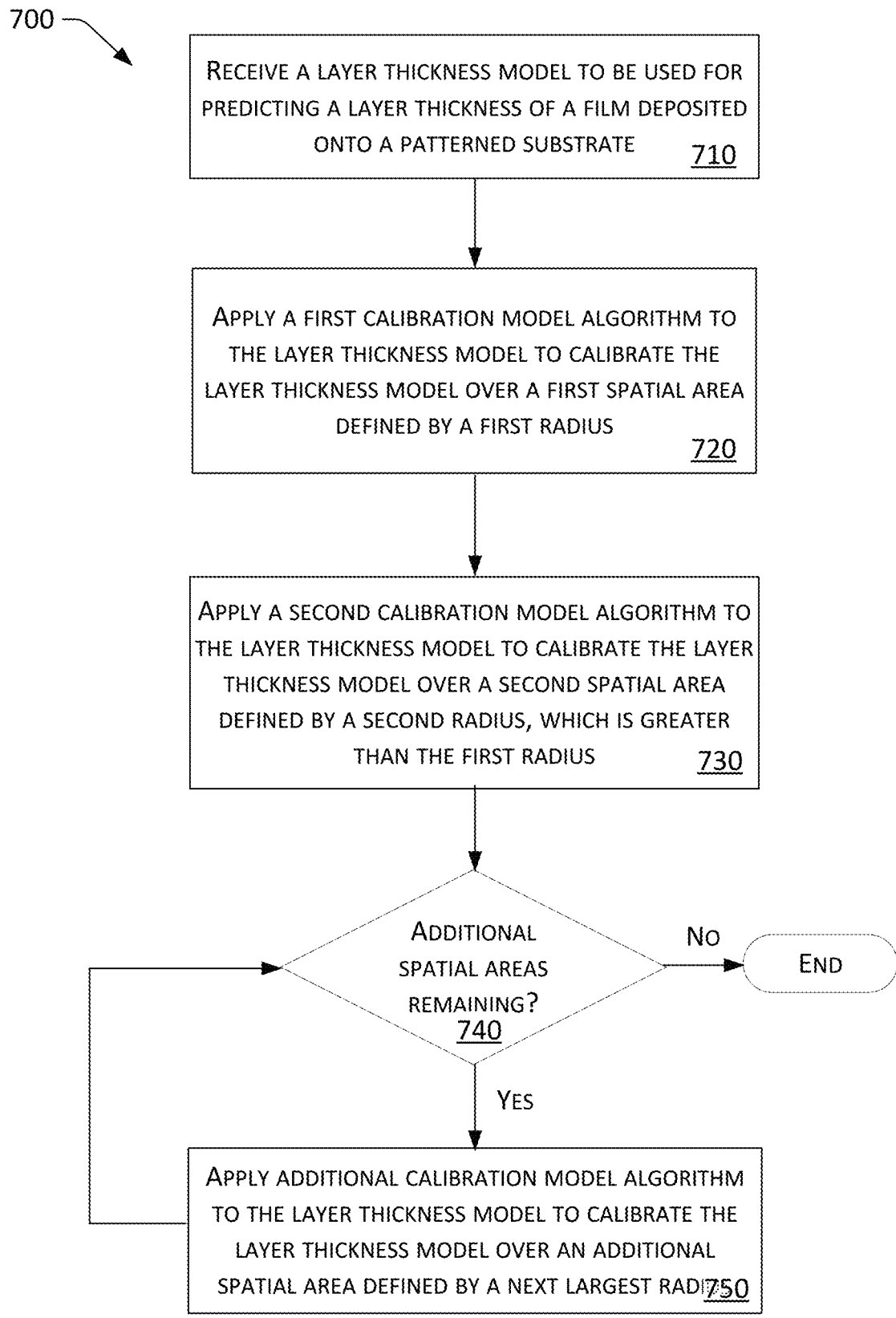
FIG. 7 is a flow chart diagram illustrating one embodiment of a method or process for calibrating a layer thickness model over a patterned topography in accordance with the technology described herein.

FIGS. 5-7 illustrate example processes and details related to the model creation and calibration 120 section of FIG. 1. In particular, FIG. 5 provides a high-level flow chart diagram illustrating an example process 500 that may be used to create and calibrate a layer thickness model over a patterned topography. Additional details for generating a layer thickness model over a patterned topography are provided in the example process 600 shown in FIG. 6. Additional details for calibrating the layer thickness model over one or more radial positions or defined spatial areas of a die or wafer are provided in the example process 700 shown in FIG. 7. The process 500 shown in FIG. 5, the process 600 shown in FIG. 6 and the process 700 shown in FIG. 7 may each be implemented using one or more programming algorithms implemented on one or more computer systems or processors. Data may be collected from a patterned topography, and may be processed to generate a layer thickness model. Once a layer thickness model is generated, one or more calibration model algorithms (implemented on a computer system or processor) may be applied to calibrate the layer thickness model over one or more spatial areas of the patterned topography.

As shown in FIG. 5, the process 500 includes designing appropriate test structures, possibly on a mask that may be used to generate a patterned topography on a substrate (in step 510). Various test structures may be designed and placed on an experimental mask that can be used for layer thickness metrology. Test structure design constraints typically center around metrology, process, materials, and available area on the mask. In some implementations, the test structure design may be created or supplied, at least in part, by a design system or may be created manually.

In step 512, the process 500 determines an appropriate metrology plan for collecting data across the patterned topography. Metrology options may include, but are not limited to: transmission electron microscope (TEM) cross-section, scanning electron microscope (SEM) cross-section, profilometry, patterned wafer geometry (PWG), and scatterometry. In some implementations, the metrology plan may be created or supplied, at least in part, by an algorithm or may be created manually.

In step 514, the process 500 collects data across the patterned topography in accordance with the metrology plan. Examples of data that may be collected in step 514 include, but are not limited to, feature dimensions (e.g., a CD, depth and/or bottom angle of a trench), feature shapes, surrounding pattern density, mask tone and layer thickness measurement values. It will be recognized by those skilled in the art that other data may be collected. As noted above, the feature dimensions of a trench and/or the trench shape may vary across a patterned topography as a function of wafer radius (R), trench CD, trench pitch (p) and/or surrounding pattern density (PD). Therefore, obtaining accurate data from SEM cross-sections (or some other form of metrology) is important.

In step 516, the process 500 determines appropriate calibration model algorithm(s) that best-fit the data collected in step 514 and inputs the data into one or more calibration model algorithms in step 518. In some embodiments, the data collected in step 514 may be converted into a design file format, such as for example, a graphics database system (GDS) format, before it is input into the calibration model algorithm(s) in step 518. In some embodiments, design files (e.g., GDS files) and/or mask files with trench patterns and surrounding patterns may be collated to provide relevant inputs to the calibration model algorithm(s). Examples of such input include, but are not limited to, feature dimensions, GDS files with surrounding pattern density, mask tone and layer thickness measurement values. In some embodiments, the design file shapes may be converted into binary text files with feature (e.g., trench) locations on a user defined grid. Metrology values may be input into a mirrored text file on an identical grid.

In steps 518-520, the data is input into one or more calibration model algorithms and an iterative process is used to fit the data to the most appropriate calibration model algorithm(s) and parameters until model target residuals are achieved. In some embodiments, steps 516-520 may be repeated for a given calibration model algorithm at one or more radial positions to improve the accuracy of the layer thickness measurement derived in FIG. 8.

In step 522, the process 500 verifies the accuracy of the calibration model with additional data and/or process conditions. For example, the accuracy of the calibration model may be verified in step 522 by comparing the model error relative to experimental data over a spatial area defined by each radial position.

FIG. 6 provides additional details for generating a layer thickness model over a patterned topography. More specifically, FIG. 6 provides an example process 600 that may be used to generate a layer thickness model that more accurately simulates patterned topography trends, as a function of feature dimensions, surrounding pattern density and radial position across the patterned substrate (or die).

In step 610, the process 600 receives substrate patterning information for a patterned substrate. The substrate patterning information may include various dimensions and/or shapes for one or more features (e.g., a trench) formed on or within the patterned substrate. As noted above, the dimensions of a trench and/or the trench shape may vary across a patterned topography as a function of wafer radius (R), trench CD, trench pitch (p) and/or surrounding pattern density (PD). Therefore, the feature dimensions received in step 610 may be collected across one or more of these variables of interest (e.g., R, CD, p and/or PD). In some embodiments, the substrate patterning information received in step 610 may include additional information, such as for example, the mask tone and the pattern density surrounding the one or more features formed on the patterned substrate.

In step 620, the process 600 generates a topography map of the patterned substrate, where the topography map is based, at least in part, on the substrate patterning information. The topography map generated in step 620 may include an arrangement of one or more features formed on or within the patterned substrate, and in some embodiments, a pattern density surrounding the one or more features. In some cases, the one or more features formed on or within the patterned substrate may vary in depth, width, and/or angle. In some cases, the distance (or pitch) between features may also vary across the patterned substrate. In some embodiments, the topography map generated in step 620 may include a trench, as shown for example in FIGS. 2A-2B. In some embodiments, the topography map may further include a pattern surrounding a trench (or another feature on the patterned topography), as shown for example in FIGS. 3A-3C.

In step 630, the process 600 receives layer thickness measurement values based, at least in part, on a thickness of a layer being deposited on the patterned substrate and the arrangement of the one or more features formed on or within the patterned substrate. The layer thickness measurement values may include thickness data for one or more layers deposited on the patterned substrate, where the layer(s) include for example a blanket layer, a patterned layer, or a treated layer. The thickness data includes a plurality of layer thickness data points (i.e., layer thickness measurement values and locations on a user defined grid) that correspond to the one or more features formed on or within the patterned substrate. In some embodiments, the layer thickness measurement values may be received or obtained from SEM cross-sections (or some other form of metrology).

In step 640, the process 600 generates a layer thickness model of the patterned substrate based, at least in part, on the topography map generated in step 620 and the layer thickness measurement values received in step 630. The layer thickness model is a model (i.e., a simulation) of layer thickness deposited over the patterned substrate that is derived from the substrate patterning information included within the topography map and the plurality of layer thickness data points (i.e., layer thickness measurement values and locations on a user defined grid) that correspond to the one or more features formed on or within the patterned substrate. As such, the layer thickness model includes an estimated layer thickness of a layer deposited onto the patterned substrate and an arrangement of one or more features, which are formed on or within the patterned substrate at various locations on the user defined grid. Once the layer thickness model is generated in step 640, it can be calibrated by applying one or more calibration model algorithms to the layer thickness model, as discussed below with reference to FIG. 7.

FIG. 7 provides additional details for calibrating a layer thickness model over a patterned topography. More specifically, FIG. 7 provides an example process 700 that may be used to calibrate a layer thickness model over one or more spatial areas of a patterned topography to account for radial variations in the patterned topography and the subsequent layer thickness response.

In step 710, the process 700 receives a layer thickness model to be used for predicting a layer thickness of a layer deposited onto a patterned substrate. The layer thickness model received in step 710 includes an estimated thickness of a layer deposited onto the patterned substrate and an arrangement of one or more features formed on the patterned substrate. In some embodiments, the layer thickness model received in step 710 may be generated via the process 600 shown in FIG. 6 and discussed above.

In step 720, the process 700 applies a first calibration model algorithm to the layer thickness model generated in step 710 to calibrate the layer thickness model over a first spatial area defined by a first radius. In some embodiments, the first calibration model algorithm may be applied to the layer thickness model over a relatively small radius, R1 (e.g., about 1 µm), to account for feature (e.g., trench) affects in the layer thickness prediction.

One example of a first calibration model algorithm that may be applied to the layer thickness model in step 720 is shown in EQ. 1 below.

$$h(x,y) = h_o + \Sigma_o^{R1} C_i p(x,y) * Tr(x,y) \qquad \text{EQ. 1}$$

The calibration model algorithm shown in EQ. 1 provides a mathematical representation of the layer height h(x,y), or layer thickness, at each (x,y) location in a user defined grid. In EQ. 1, h(x,y) is the layer height (z) at location (x,y) in a user defined grid, $h_o$ is a constant representing a blanket layer thickness with no underlying topography, $C_i$ is a constant, p(x,y) is a selectable proximity function and Tr(x, y) represents the trench locations within the grid. Thus, in the calibration model algorithm shown in EQ. 1, the layer height h(x,y), or layer thickness, at each (x,y) location in the user defined grid is determined by summing a constant ($C_i$) multiplied with the selectable proximity function p(x,y) and the trench locations Tr(x,y) across the first radius (R1) and adding the blanket layer thickness ($h_o$) to the sum.

In some embodiments, a proximity function having a Gaussian form may be used in the calibration model algorithm shown in EQ. 1. One example of a proximity function in a Gaussian form is shown in EQ. 2.

$$p(x, y) = \frac{d}{\pi\sigma^2} e^{\frac{-(x^2+y^2)^{1/2}}{\sigma^2}} \qquad \text{EQ. 2}$$

By using a proximity function as shown in EQ. 2, the trench depth (d), as well as the search radius σ, are used to relate trench locations Tr(x,y) to layer height h(x,y) above each (x,y) location in the user defined grid.

EQs. 1 and 2 represent one example of a first calibration model algorithm that can be applied to the layer thickness model in step 720 to provide best-fit parameters for the data contained within the layer thickness model. It will be recognized that the concepts described herein are not limited to the particular calibration models described herein and other calibration models may be utilized. As noted above and shown in EQ. 1, the first calibration model algorithm is applied to the layer thickness model over a relatively small radius, R1 (e.g., about 1 μm), to account for feature (e.g., trench) affects in the layer thickness prediction. As such, the first calibration model algorithm can be applied to the layer thickness model to provide estimations of a localized layer height (h) in the near vicinity over the trench topography.

In step 730, the process 700 applies a second calibration model algorithm to the layer thickness model received in step 710 to calibrate the layer thickness model over a second spatial area defined by a second radius, which is greater than the first radius. In some embodiments, the second calibration model algorithm may be applied to the layer thickness model over a larger radius, R2 (e.g., about 10 μm, 100 μm, 1000 μm or more), to account for surrounding pattern density affects in the layer thickness prediction.

Two examples of a second calibration model algorithm that may be applied to the layer thickness model in step 730 are shown in EQs. 3 and 4 below.

$$B = C_2 * \sum_0^{R2} Tr(x, y) * \frac{d}{A*h_o} \qquad \text{EQ. 3}$$

$$B = C_2 * \left(\left[\left\{\sum_0^{R2} Tr(x, y) * \frac{d}{A*h_o}\right\} - C_3\right]^{C_4} + C_5\right) \qquad \text{EQ. 4}$$

The calibration model algorithm shown in EQ. 3 is a linear bias model (B) that can be used to derive a pattern density correction factor, which is linearly proportional to the pattern density surrounding the feature (e.g., trench). The calibration model algorithm shown in EQ. 4 is an exponential bias model (B) that can be used to derive a pattern density correction factor, which is proportional to the surrounding pattern density through an exponential function. In EQs. 3 and 4, Tr(x,y) represents the trench locations within the user defined grid, d is the trench depth, A is the spatial area defined by the radius R2, $h_o$ is a constant representing a blanket layer thickness with no underlying topography, and $C_2$-$C_5$ are constants.

EQs. 3 and 4 represent examples of a second calibration model algorithm that can be applied to the layer thickness model received in step 710. As shown in EQs. 3 and 4, the second calibration model algorithm is applied to the layer thickness model over a larger radius, R2 (e.g., about 10 μm, 100 μm, 1000 μm or more), to account for surrounding pattern density affects in the layer thickness prediction.

$$h(x,y)=B\{h_o+\Sigma_0^{R1}C_ip(x,y)*Tr(x,y)\} \qquad \text{EQ. 5}$$

Figure 8:
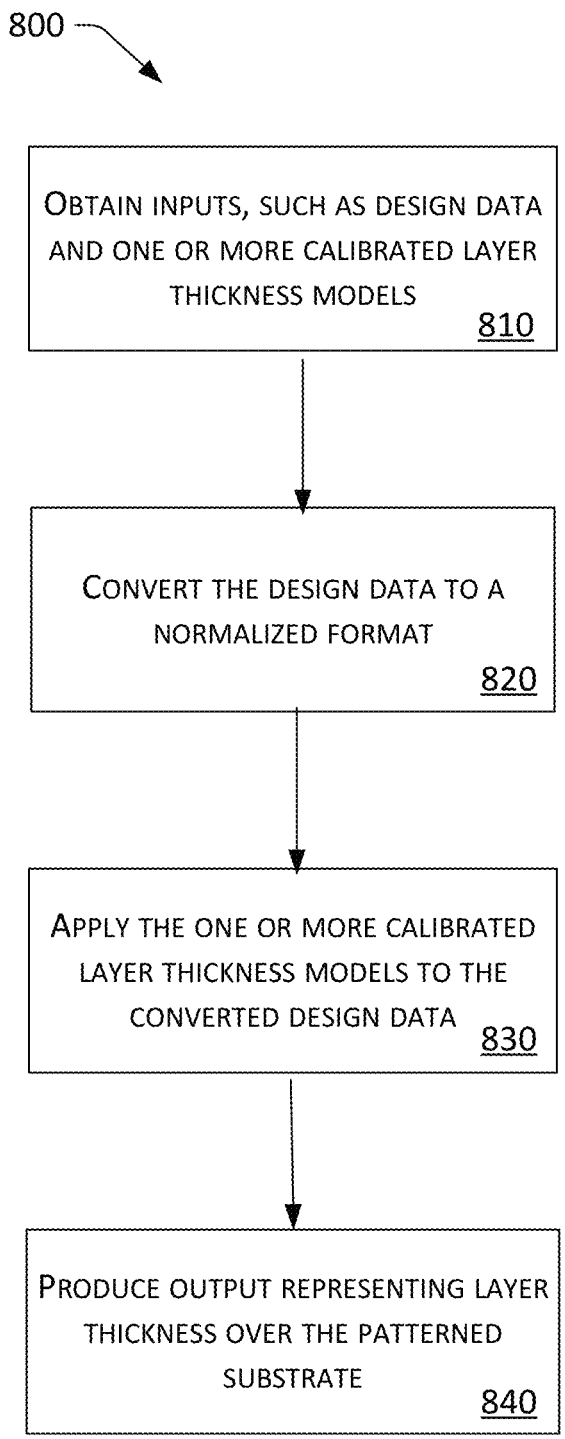
FIG. 8 is a flow chart diagram illustrating one embodiment of a method or process for applying a calibrated layer thickness model to predict layer thickness in accordance with the technology described herein.

By applying the first calibration model algorithm to the layer thickness model over a relatively small radius (R1) and applying the second calibration model algorithm to the layer thickness model over larger radius (R2), as shown in EQ. 5 above, the process 700 shown in FIG. 7 improves the accuracy of the layer thickness prediction in FIG. 8 by accounting for radial variations in the patterned topography.

In some embodiments, a layer thickness model may be calibrated across over a first spatial area defined by a first radius (R1) and over a second spatial area defined by a second radius (R2), as noted above and depicted in the example scenario 400 shown in FIG. 4A. However, the calibration process described herein is not limited to only two spatial areas. In some embodiments, the layer thickness model may be calibrated over a plurality of spatial areas (e.g., A, B, C and/or D), each defined by their own radius (e.g., R1, R2, R3 and/or R4), as depicted in the example scenario 450 shown in FIG. 4B. Although two spatial areas are depicted in FIG. 4A and four spatial areas are depicted in FIG. 4B, the layer thickness model described herein may be calibrated over any number of spatial areas, as needed, to accurately predict layer thickness over a patterned topography.

In step 740, the process 700 determines if there are additional spatial areas of the layer thickness model that require calibration. If additional spatial areas remain (Yes branch of step 740), the process 700 applies an additional calibration model algorithm to the layer thickness model to calibrate the layer thickness model over an additional spatial area defined by a next largest radius in step 750. In the example scenario 450 shown in FIG. 4B, for example, an additional calibration model algorithm may be applied to the layer thickness model to calibrate the layer thickness model over the spatial area C defined by radius R3. In some embodiments, the additional calibration model algorithm may be a linear or exponential bias model (B) as shown in EQs. 3 and 4 above, or may be another type of calibration model algorithm. As shown in FIG. 7, the process 700 may continue to apply additional calibration model algorithms to the layer thickness model in steps 740 and 750 until no spatial areas remain (No branch of step 740). Once the layer thickness model is calibrated in accordance with process 700, it can be applied to a design data file to predict layer thickness (i.e., spin on layer planarization) over the patterned topography, as discussed below with reference to FIG. 8.

In the embodiment shown in FIG. 7, the process 700 calibrates the layer thickness model over a plurality of spatial areas (e.g., A, B, C, D, etc.), where each spatial area is defined by its own radius (e.g., R1, R2, R3, R4, etc.). For each spatial area, the process 700 creates a parameterized, calibrated layer thickness model, which can be applied separately to the design data file to account for radial variations in the patterned topography.

For example, a first calibration model algorithm can be applied to the layer thickness model over a first spatial area (e.g., A) to generate a calibrated layer thickness model that accounts for feature (e.g., trench) affects in the predicted layer thickness. While the local impact on spin on layer planarization due to a single feature is relatively small, the impact of the surrounding pattern density on planarization is significantly greater over a larger radius. Having a calibration model that accounts for both the local "feature" impact and the larger radius impact due to the surrounding pattern density increases prediction accuracy and understanding of whether corrective action should be taken in downstream processing. The present disclosure provides such a calibration model by applying one or more additional calibration model algorithms to the layer thickness model over one or more additional spatial areas (e.g., B, C, D, etc.) to generate additional calibrated layer thickness model(s) that account for surrounding pattern density affects in the predicted layer thickness.

Planarization Prediction

FIG. 8 illustrates an example process and details related to the planarization prediction 130 of FIG. 1. More specifically, FIG. 8 illustrates an example process 800 that may be used to predict layer thickness of a layer deposited over a patterned topography. The process 800 shown in FIG. 8 may be implemented using one or more computer systems. In particular, a processor included within the one or more computer systems may predict the thickness of a spin on layer deposited over a patterned topography by applying one or more calibrated layer thickness models to design data.

In step 810, the process 800 obtains various inputs to be used for layer thickness prediction over a patterned topography, wherein such inputs include a design data file and one or more calibrated layer thickness models. The one or more calibrated layer thickness models may be generated as described above in reference to FIG. 7. In some embodiments, the process 800 may obtain additional inputs in step 810, such as for example, appropriate tone (positive/negative) of design topography, trench thickness as a function of design input or constants, grid size, etc.

In step 820, the process 800 converts the design data file from one format to another. For example, the design data is typically in a file format specifically associated with such data, such as GDS, Oasis, etc. In some embodiments, the design data file may be converted to a "normalized" file format (e.g., a text file) in step 820 with feature (e.g., trench) locations specified on a user defined grid.

In step 830, the process 800 applies the one or more calibrated layer thickness models to the converted design data file to generate output (in step 840) that represents the layer thickness over the patterned substrate at each (x,y) location or grid point in the converted design data file. In some embodiments, the layer thickness output may be a text file. In other embodiments, the layer thickness output may be represented in 3-dimensional form with utilities such as MATLAB®.

In some embodiments, a first calibrated layer thickness model may be applied to the converted design data file in step 830 to account for feature (e.g., trench) affects in the layer thickness values predicted in step 840. In some embodiments, the first calibrated layer thickness model may be generated by applying a calibration model algorithm to a layer thickness model over a first spatial area, as described above in step 720 of FIG. 7.

In some embodiments, one or more additional calibrated layer thickness models may be applied to the converted design data file in step 830 to account for surrounding pattern density affects in the layer thickness values predicted in step 840. In some embodiments, the one or more calibrated layer thickness models may be generated by applying one or more calibration model algorithm to a layer thickness model over one or more spatial areas, as described above in steps 730-750 of FIG. 7.

In some embodiments, step 830 may apply a calibrated layer thickness model to the converted design data file across a die, as a function of key variables (e.g., CD, pitch and pattern density), before making model corrections, as a function of radius, across the substrate.

Additional and Alternative Implementation Details

"Substrate" as used herein generically refers to an object being processed in accordance with the invention. The substrate may include any material portion or structure of a device, particularly a semiconductor or other electronics device, and may, for example, be a base substrate, such as a semiconductor wafer, mask, or a layer on or overlying a base substrate such as a thin layer. Thus, the substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

Reference herein to "one embodiment" or "an embodiment" refers to one or more features, structures, materials, or characteristics described at least one example embodiment of the technology described herein. It does not denote or imply that the features, structures, materials, or characteristics are present in every embodiment. Thus, the appearances of the phrases "in one embodiment" or "in an embodiment" in various places throughout this document are not necessarily referring to the same embodiment of the technology. Furthermore, the features, structures, materials, or characteristics may be combined in any suitable manner in one or more embodiments.

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

It will be understood that one or more of the tasks, functions, or methodologies described herein may be implemented, for example, as firmware or as a computer program of instructions embodied in a non-transitory tangible computer readable medium that is executed by a processor or other suitable processing device. As noted above, for example, the processes shown in FIGS. 5-8 and described herein may be performed, at least in part, by a processor included within one or more computer systems. Examples of suitable processors may include, but are not limited to, a central processing unit (CPU), embedded controller, microcontroller, processor, microprocessor, field programmable gate array (FPGA), application specific integrated circuit (ASIC), or other suitable processing device.

The term "computer readable medium" is non-transitory computer-storage media. For example, non-transitory computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventors invoke 35 U.S.C. § 112(f) only when the words "means for" or "steps for" are used in the claim. If such words are not used in a claim, then the inventors do not intend for the claim to be construed to cover the corresponding structure, material, or acts described herein (and equivalents thereof) in accordance with 35 U.S.C. 112(f).

What is claimed is:

1. A method for predicting a critical dimension of a layer being deposited onto a patterned substrate as part of a fabrication process, the method comprising:
   receiving substrate patterning information for the patterned substrate;
   generating a critical dimension model based, at least in part, on the substrate patterning information and layer critical dimension values;
   applying a first calibration model algorithm to the critical dimension model to calibrate the critical dimension model over a first spatial area defined by a first radius to generate a first calibrated layer thickness model;
   applying a second calibration model algorithm to the critical dimension model to calibrate the critical dimension model over a second spatial area defined by a second radius which is greater than the first radius to generate a second calibrated layer thickness model;
   calibrating the critical dimension model with the first and second calibrated layer thickness models to generate a calibrated critical dimension model; and
   controlling at least a portion of a planarization in the fabrication process based on the calibrated critical dimension model.

2. The method of claim 1, wherein the substrate patterning information includes one or more feature dimensions and/or feature shapes of one or more features formed on or within the patterned substrate.

3. The method of claim 2, wherein the substrate patterning information further includes a pattern density surrounding the one or more features formed on or within the patterned substrate.

4. The method of claim 3, wherein the one or more feature dimensions and/or feature shapes of the one or more features vary across the patterned substrate, and wherein variances in the one or more feature dimensions and/or feature shapes result in layer critical dimension differences across the patterned substrate.

5. The method of claim 4, wherein the one or more feature dimensions and/or the feature shapes vary across the patterned substrate as a function of substrate radius (R), feature critical dimension (CD), pitch (p) between features and/or pattern density (PD) surrounding the one or more features.

6. The method of claim 1, wherein the critical dimension model is a layer thickness model and the layer critical dimension values are layer thickness measurement values.

7. The method of claim 6, wherein said generating a layer thickness model comprises:
   generating a topography map of the patterned substrate based, at least in part, on the substrate patterning information, wherein the topography map includes an arrangement of one or more features formed on or within the patterned substrate;
   receiving the layer thickness measurement values, wherein the layer thickness measurement values include a plurality of layer thickness data points that correspond to the one or more features formed on or within the patterned substrate; and
   generating the layer thickness model based, at least in part, on the topography map and the plurality of layer thickness data points.

8. The method of claim 7, wherein the topography map further includes a pattern density surrounding the one or more features.

9. The method of claim 6, wherein the first calibration model algorithm comprises a mathematical representation of the layer thickness at each location in a user defined grid, and wherein said applying the first calibration model algorithm comprises summing a constant multiplied with a selectable proximity function and locations of features within the user defined grid across the first radius, and adding a blanket layer thickness to a sum created by the summing.

10. The method of claim 6, wherein the first calibrated layer thickness model accounts for feature effects in a prediction of layer thickness.

11. The method of claim 6, wherein the second calibrated layer thickness model accounts for surrounding pattern density effects in a prediction of layer thickness.

12. The method of claim 11, wherein the second calibration model algorithm comprises a linear bias model that derives a pattern density correction factor, which is linearly proportional to a pattern density surrounding the one or more features.

13. The method of claim 11, wherein the second calibration model algorithm comprises an exponential bias model that derives a pattern density correction factor, which is proportional to a pattern density surrounding the one or more features through an exponential function.

14. The method of claim 6, wherein the first and second spatial areas are part of a plurality of spatial areas of the layer thickness model each defined by a different radius, and further comprising determining if there are spatial areas of the layer thickness model that remain to be calibrated.

15. The method of claim 14, wherein the first and second calibration model algorithms are part of a plurality of calibration model algorithms each associated with a different spatial area of the plurality of spatial areas, and if said determining determines that one or more spatial areas of the layer thickness model remain to be calibrated, the method further comprises:
applying the calibration model algorithm of the plurality of calibration model algorithms associated with the spatial area having the next largest radius to the layer thickness model to calibrate the layer thickness model over the spatial area defined by the next largest radius; and
repeating said determining and said applying of calibration model algorithms until the calibration model algorithm for each spatial area has been applied.

16. The method of claim 15, wherein said applying of each calibration model algorithm generates a respective calibrated layer thickness model that accounts for surrounding pattern density effects in a prediction of layer thickness.

17. The method of claim 6, further comprising:
obtaining inputs including design data; and
converting the design data to a normalized format with locations specified on a user defined grid.

18. The method of claim 17, further comprising applying the first and second calibrated layer thickness models to the converted design data to generate output representing the layer thickness of the layer deposited onto the patterned substrate at each location on the user defined grid.

19. The method of claim 18, wherein said applying the first and second calibrated layer thickness models comprises:
applying the first calibrated layer thickness model generated by said applying the first calibration model algorithm to the layer thickness model over the first spatial area;
wherein the first calibrated layer thickness model accounts for feature effects in the output representing the layer thickness.

20. The method of claim 18, wherein said applying the first and second calibrated layer thickness models comprises:
applying the second calibrated layer thickness model generated by said applying the second calibration model algorithm to the layer thickness model over the second spatial area;
wherein the second calibrated layer thickness model accounts for surrounding pattern density effects in the output representing the layer thickness.

21. The method of claim 18, wherein the first and second calibration model algorithms are part of a plurality of calibration model algorithms each associated with a different spatial area of the plurality of spatial areas, and further comprising:
applying each of the calibrated layer thickness models to the layer thickness model over each respective spatial area;
wherein the calibrated layer thickness models account for surrounding pattern density effects in the output representing the layer thickness.

* * * * *